(12) United States Patent
Lee et al.

(10) Patent No.: US 11,176,456 B2
(45) Date of Patent: Nov. 16, 2021

(54) PRE-TRAINING NEURAL NETWORKS USING DATA CLUSTERS

(71) Applicant: International Business Machines Corporation, Armonk, NY (US)

(72) Inventors: Kyusong Lee, Pittsburgh, PA (US); Youngja Park, Princeton, NJ (US)

(73) Assignee: International Business Machines Corporation, Armonk, NY (US)

( * ) Notice: Subject to any disclaimer, the term of this patent is extended or adjusted under 35 U.S.C. 154(b) by 1023 days.

(21) Appl. No.: 15/825,591

(22) Filed: Nov. 29, 2017

(65) Prior Publication Data

US 2019/0164054 A1    May 30, 2019

(51) Int. Cl.
| | |
|---|---|
| *G06N 3/08* | (2006.01) |
| *G06K 9/62* | (2006.01) |
| *G06F 9/44* | (2018.01) |
| *G06N 20/00* | (2019.01) |
| *G06F 16/35* | (2019.01) |

(52) U.S. Cl.
CPC ............ *G06N 3/082* (2013.01); *G06F 9/44* (2013.01); *G06F 16/355* (2019.01); *G06K 9/6218* (2013.01); *G06K 9/6259* (2013.01); *G06N 20/00* (2019.01)

(58) Field of Classification Search
None
See application file for complete search history.

(56) References Cited

U.S. PATENT DOCUMENTS

| | | |
|---|---|---|
| 2013/0138436 A1 | 5/2013 | Yu |
| 2015/0278200 A1 | 10/2015 | Xiaodong |

OTHER PUBLICATIONS

Dara, Rozita, Stefan C. Kremer, and Deborah A. Stacey. "Clustering unlabeled data with SOMs improves classification of labeled real-world data." Proceedings of the 2002 International Joint Conference on Neural Networks. IJCNN'02 (Cat. No. 02CH37290). vol. 3. IEEE, 2002. (Year: 2002).*
Erhan, Dumitru, et al. "The difficulty of training deep architectures and the effect of unsupervised pre-training." Artificial Intelligence and Statistics, pp. 153-160. PMLR, 2009. (Year: 2009).*

(Continued)

*Primary Examiner* — Vincent Gonzales
(74) *Attorney, Agent, or Firm* — Erik C. Swanson (57) ABSTRACT

Aspects of the present invention disclose a method, computer program product, and system for pre-training a neural network. The method extracting features of data set received from a source, the data set includes labelled data and unlabeled data. Generating a plurality of data clusters from instances of data in the data set, the data clusters are weighted according to a respective number of similar instances of labeled data and unlabeled data within a respective data cluster. Determining a data label indicating a data class that corresponds to labeled data within a data cluster of the generated plurality of data clusters. Applying the determined data label to unlabeled data within the data cluster of the generated plurality of data clusters. In response to applying the determined data label to unlabeled data within the data cluster of the generated plurality of data clusters, deploying the data cluster to a neural network.

20 Claims, 8 Drawing Sheets

(56) References Cited

OTHER PUBLICATIONS

Hartigan, John A., and Manchek A. Wong. "AK-means clustering algorithm." Journal of the Royal Statistical Society: Series C (Applied Statistics) 28.1 (1979): 100-108. (Year: 1979).*

Role, François, and Mohamed Nadif. "Beyond cluster labeling: Semantic interpretation of clusters' contents using a graph representation." Knowledge-Based Systems 56 (2014): 141-155. (Year: 2014).*

Bengio et al., "Greedy Layer-Wise Training of Deep Networks", Advances in Neural Information Processing Systems 19 (NIPS '06), 2007, pp. 153-160.

Erhan, et al., "Why Does Unsupervised Pre-training Help Deep Learning?", Journal of Machine Learning Research, vol. 11, Mar. 1, 2010, pp. 625-660.

Hinton, Geoffrey, "A Practical Guide to Training Restricted Boltzmann Machines", Version 1, UTML TR 2010-003, Department of Computer Science, University of Toronto, Aug. 2, 2010, 21 pages.

Larochelle et al., "Exploring Strategies for Training Deep Neural Networks", Journal of Machine Learning Research 1 (2009), pp. 1-40.

Zhou et al., "A Cluster-Based Multiple Deep Neural Networks Method for Large Vocabulary Continuous Speech Recognition", 2013 IEEE International Conference on Acoustics, Speech and Signal Processing, pp. 6650-6654.

\* cited by examiner

PRE-TRAINING NEURAL NETWORKS USING DATA CLUSTERS

BACKGROUND

The present invention relates generally to the field of machine learning and more particularly to deep learning.

Deep learning (also known as deep structured learning or hierarchical learning) is part of a broader family of machine learning methods based on learning data representations, as opposed to task-specific algorithms. Learning can be supervised, partially supervised, or unsupervised. Some representations are loosely based on interpretation of information processing and communication patterns in a biological nervous system, such as neural coding that attempts to define a relationship between various stimuli and associated neuronal responses in the brain. Research attempts to create efficient systems to learn these representations from large-scale, unlabeled data sets.

A deep neural network (DNN) is an artificial neural network (ANN) with multiple hidden layers between the input and output layers. Similar to shallow ANNs, DNNs can model complex non-linear relationships. DNN architectures generate compositional models where the object is expressed as a layered composition of primitives. The extra layers enable composition of features from lower layers, potentially modeling complex data with fewer units than a similarly performing shallow network Deep learning architectures, such as deep neural networks (DNN), include many variants of a few basic approaches. Each architecture has found success in specific domains. It is not always possible to compare the performance of multiple architectures unless they have been evaluated on the same data sets. DNNs are typically feedforward networks in which data flows from the input layer to the output layer without looping back.

SUMMARY

According to one embodiment of the present invention, a method for pre-training a neural network is provided. The method includes one or more processors extracting features of a data set received from a source, where the data set includes labeled data and unlabeled data. The method includes one or more processors generating a plurality of data clusters from instances of data in the data set, wherein the data clusters are weighted according to a respective number of similar instances of labeled data and unlabeled data within a respective data cluster. The method includes one or more processors determining a data label indicating a data class that corresponds to labeled data within a data cluster of the generated plurality of data clusters. The method includes one or more processors applying the determined data label to unlabeled data within the data cluster of the generated plurality of data clusters. The method includes one or more processors in response to applying the determined data label to unlabeled data within the data cluster of the generated plurality of data clusters, deploying, by one or more processors, the data cluster to a neural network.

DETAILED DESCRIPTION

Embodiments of the present invention recognize that deep-learning methods applied to a classification task require a large amount of labeled training data, and obtaining a large set of labeled data is very difficult in real-world applications. Embodiments of the present invention also recognize that deep learning can be limited by the out of vocabulary problem of unknown words that appear in testing data but not seen while training the deep network. Embodiments of the present invention recognize that deep networks are sensitive to the initial weights assigned to data, and the accuracy of further assigned data can vary largely on the initialization mechanism. When deep neural networks are randomly initialized, the deep neural networks can be slow to converge, and the network often falls into a local optimum that produces a less optimal solution.

Embodiments of the present invention recognize that current approaches to classify data in deep networks can use a random initialization that causes the resultant networks from the deep network to suffer from inaccuracy because deep networks are sensitive to the initial weights assigned to the labeled data. The accuracy of resultant data depends largely on the initialization mechanism.

Embodiments of the present invention provide a method that pre-trains, to improve initialization, deep neural networks, resulting in networks producing results in an improved classification, with a small amount of labeled data. Embodiments of the present invention provide a method to use labeled and unlabeled data to overcome the data bottleneck problem that results from training the deep learning classifiers with a large amount of data. Embodiments of the present invention provide a method of a clustering algorithm to capture semantic relations and to enlarge the training data to overcome the out of vocabulary problem.

Figure 1:
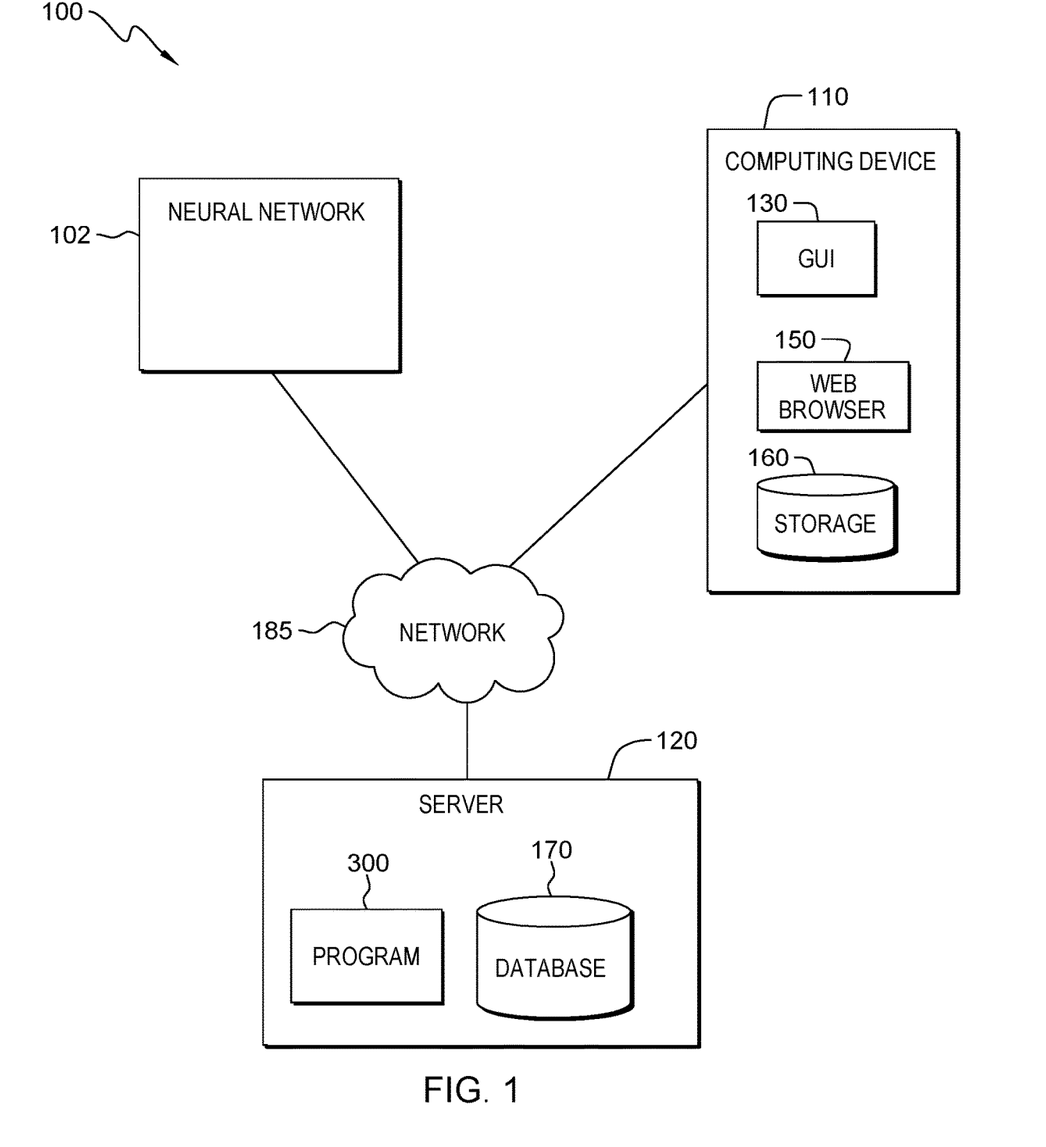
FIG. 1 is a functional block diagram illustrating a distributed data processing environment, in accordance with an embodiment of the present invention.

Example embodiments, in accordance with the present invention, will now be described in detail with reference to the Figures. FIG. 1 is a functional block diagram, illustrating distributed data processing environment 100. Distributed data processing environment 100 includes neural network 102, computing device 110, server 120, interconnected over network 185.

In one embodiment, neural network 102 is a computing system modeled after human biological brains. Neural network 102 is based on a collection of connected units called artificial neurons. Each connection between neurons transmit a signal to another neuron and the neurons are represented by real numbers. Neural network 102 is capable of learning to progressively improve how neural network 102 performs tasks by considering examples of tasks without task specific programming. Neural network 102 has weights that determine what neural network 102 will produce for output given the initial training data. Weights refer to the strength or amplitude of a connection between two nodes in the inner, hidden, and outer layers, not shown, of neural network 102. In an example, neural network 102, in image recognition, learns to identify images that contain cats by analyzing example images that have been labeled as "dog" or "no dog." Neural network 102 uses the analytic results to identify dogs in other images.

In one embodiment, computing device 110 includes graphical user interface (GUI) 130, web browser 150, and storage 160. The various programs on computing device 110 include a web browser, an electronic mail client, security software (e.g., a firewall program, a geo-locating program, an encryption program, etc.), an instant messaging (IM) application (app), and a communication (e.g., phone) application.

Computing device 110 may be a desktop computer, a laptop computer, a tablet computer, a specialized computer server, a smartphone, a wearable device (e.g., smart watch, personal fitness device, personal safety device), or any programmable computer system known in the art with an interactive display or any other computer system known in the art. In certain embodiments, computing device 110 represents a computer system utilizing clustered computers and components that act as a single pool of seamless resources when accessed through network 185, as is common in data centers and with cloud-computing applications. In general, computing device 110 is representative of any programmable electronic device or combination of programmable electronic devices capable of executing machine-readable program instructions and communicating with other computer devices via a network.

In one embodiment, graphical user interface 130 operates on computing device 110. In another embodiment, graphical user interface 130 operates on another computer in a server-based setting, for example, on a server computer (e.g., server 120). In yet another embodiment, graphical user interface 130 operates on computing device 110 simultaneously with a server computer interconnected through network 185 (e.g., server 120). Graphical user interface 130 may be any user interface used to access information from computing device 110, such as information gathered or produced by program 300. Additionally, graphical user interface 130 may be any user interface used to supply information to computing device 110, such as information supplied by a user to be used by program 300. In some embodiments, graphical user interface 130 may present a generic web browser used to retrieve, present, and negotiate resources from the Internet. In other embodiments, graphical user interface 130 may be a software or application that enables a user at computing device 110 access to network 185.

In yet another embodiment, a user of computing device 110 can interact with graphical user interface 130 through a touch screen that performs as both an input device to a graphical user interface (GUI) and as an output device (i.e., an electronic display) presenting a plurality of icons associated with software applications or images depicting the executing software application. Optionally, a software application (e.g., a web browser) can generate graphical user interface 130 operating within the GUI of computing device 110. Graphical user interface 130 accepts input from a plurality of input/output (I/O) devices including, but not limited to, a tactile sensor interface (e.g., a touch screen or a touchpad) referred to as a multi-touch display. An I/O device interfacing with graphical user interface 130 may be connected to computing device 110, which may operate utilizing wired (e.g., USB port) or wireless network communications (e.g., infrared, NFC, etc.). Computing device 110 may include components, as depicted and described in further detail with respect to FIG. 3, in accordance with embodiments of the present invention.

Web browser 150 may be a generic web browser used to retrieve, present, and traverse information resources from the Internet. In some embodiments, web browser 150 may be a web browser designed for a mobile device. In other embodiments, web browser 150 may be a web browser designed for a traditional computing device, such as a desktop computer, PC, or laptop. In general, web browser 150 may be any application or software that enables a user of computing device 110 to access a webpage over network 185. In the depicted environment, web browser 150 resides on computing device 110. In other embodiments, web browser 150, or similar web browsers, may reside on other computing devices capable of accessing a webpage over network 185.

Storage 160 (e.g., a database) located on computing device 110 represents any type of storage device capable of storing data that is accessed and utilized by computing device 110. In other embodiments, storage 160 represents multiple storage devices within computing device 110. Storage 160 stores information such as, but not limited to, a history of weights from a previously generated neural network, and a history of data previously performed tasks, such as a previous classification or object detection using a neural network.

In general, network 185 can be any combination of connections and protocols that will support communications among computing device 110. Network 185 can include, for example, a local area network (LAN), a wide area network (WAN), such as the Internet, a cellular network, or any combination of the preceding, and can further include wired, wireless, and/or fiber optic connections.

Server 120 may be a desktop computer, a laptop computer, a tablet computer, a specialized computer server, a smartphone, or any other computer system known in the art. In certain embodiments, server 120 represents a computer system utilizing clustered computers and components that act as a single pool of seamless resources when accessed through network 185, as is common in data centers and with cloud-computing applications. In general, server 120 is representative of any programmable electronic device or combination of programmable electronic devices capable of executing machine-readable program instructions and communicating with other computer devices via a network. In one embodiment, server 120 includes database 170 and program 300.

In an embodiment, server 120 is capable of initiating a handshake process between server 120 and computing device 110. Handshaking is an automated process of negotiation that dynamically sets parameters of a communications channel established between two entities before normal communication over the channel begins. Handshaking follows the physical establishment of the channel and precedes normal information transfer. Handshaking facilitates connecting heterogeneous computing systems, or equipment, over a communication channel without the need for user intervention to set parameters. In an example, server 120 initiates the handshake process by sending a message to computing device 110 indicating that server 120 wants to establish a communication channel in order to gain access to programs on computing device 110.

Database 170 may be a repository that may be read by program 300. In other embodiments, a program on server 120 (not shown) may prompt and update database 170 with information. The data stored to database 170 may be changed or updated by data input by a user, such as a user with access to server 120. In one embodiment, database 170 resides on server 120. In other embodiments, database 170 may reside on another server, another computing device, or mobile device, provided that database 170 is accessible to program 300. Database 170 operates to enhance program 300 by increasing the accuracy or amount of data available to program 300.

Figure 2:
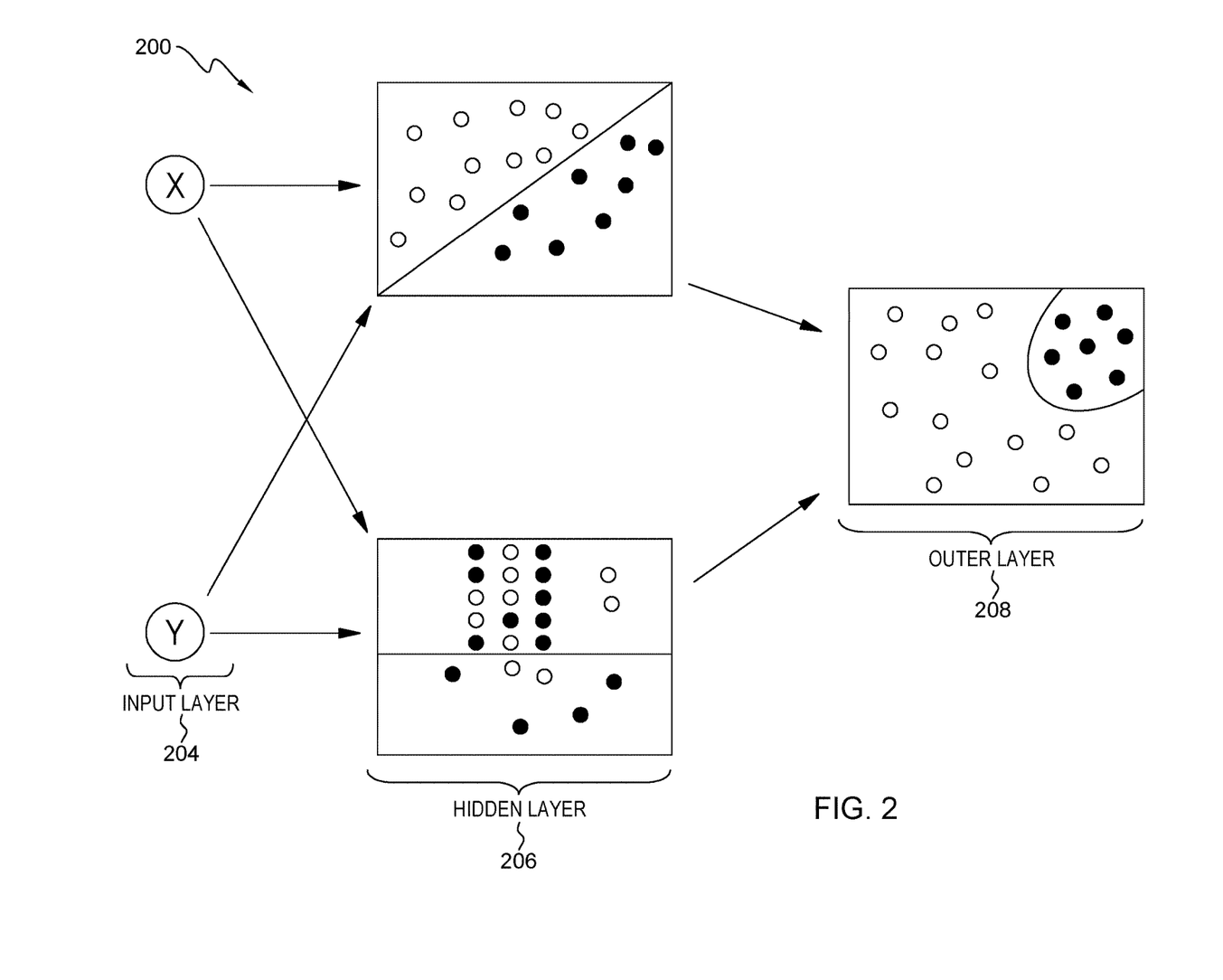
FIG. 2 illustrates an example of a configuration of a neural network in the distributed data processing environment within networked computing environment 100, in accordance with an embodiment of the present invention.

FIG. 2 depicts a diagram illustrating configuration 200 of neural network 102 within the distributed data processing environment within networked computing environment 100 of FIG. 1. In an embodiment, configuration 200 includes input layer 204, hidden layer 206, and outer layer 208.

Configuration 200 is an illustration of a neural network that provides the ability of a computing system to recognize patterns in data inputted into a system and make simple decisions about new unseen data. Input layer 204, in combination with hidden layer 206, and outer layer 208 are examples of neurons organized into layers. Input layer 204, hidden layer 206, and output layer 208 have different weights that vary as neural network 102 proceeds to learn. Input layer 204, hidden layer 206, and output 208 perform different kinds of transformations on respective inputs. An information signal travels to input layer 204, hidden layer 206, and output 208 after traversing the aforementioned layers. In neural network 202, the initial input layer 204 is capable of detecting less complex information and input layer 204's output is propagated forward through hidden layer 206 and to output layer 208 until output layer 208 performs the complex object recognition of a "dog."

Figure 3:
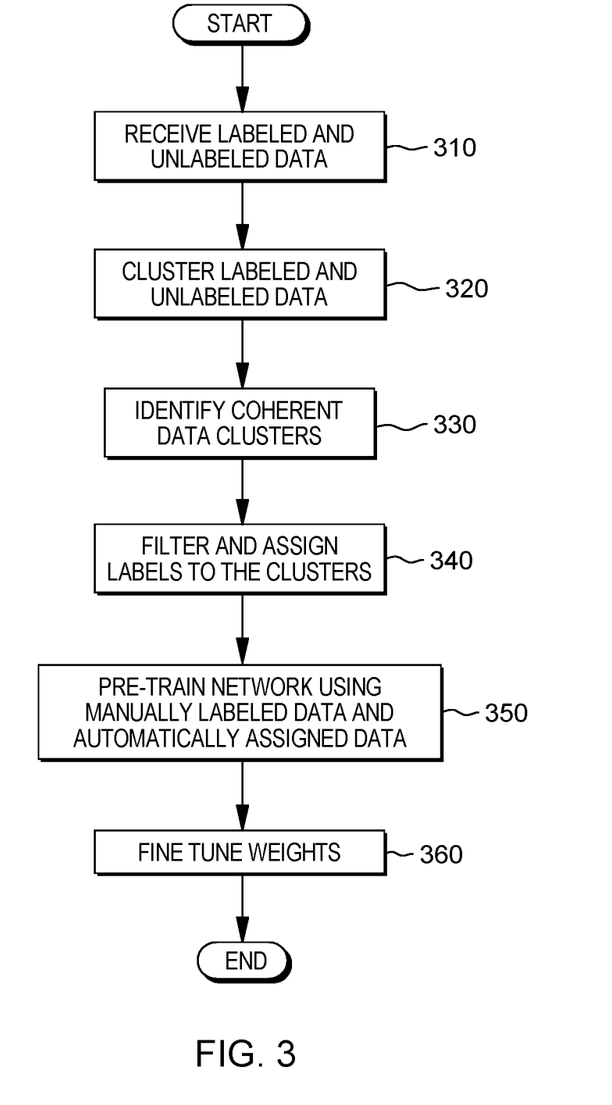
FIG. 3 is a flowchart depicting operational steps of program 300, a program for pre-training networks using clustered data, in accordance with an embodiment of the present invention.

In an embodiment, program 300 has the ability to cluster the labeled and unlabeled instances of data to find similar data groups. In an example, program 300 analyzes the labeled instances in each cluster and determines whether the cluster has a majority class. In this example, if a cluster has a majority class then program 300 labels all the unlabeled instances in the cluster as the majority class. Program 300 trains a stack of auto-encoders using both the manually labeled data and the automatically labeled data. Program 300 pre-trains on or more neural networks and fine tunes the networks again using only manually labeled instances of data. In another embodiment, program 300 determines that a cluster does not have a majority class. In this embodiment, program 300 does not utilize the unlabeled instances of a cluster.

FIG. 3 is a flowchart depicting operational steps of program 300 for pre-training a deep neural network using clustered data, in accordance with an embodiment of the present invention.

In step 310, program 300 receives labeled and unlabeled data. In an embodiment, program 300 receives, via network 185 from computing device 110 or server 120, unlabeled data that includes samples of natural or human created artifacts and labeled data that is a set of unlabeled data that has been assigned a "tag," "label," or "class" that is informative. In an example, program 300 receives unlabeled data from computing device 110 of text, photos, x-rays, videos, and audio recordings and labeled data that is labeled with data describing content included in the received text, photo, that the dot in the x-ray is a tumor, and the words in an audio recording.

In another embodiment, program 300 receives labeled and unlabeled data that already exists in neural network 102. In an example, neural network 102 utilizes data already existing in neural network 102 that is labeled and describing content included in the existing data of text, photo, and the words in an audio recording.

Figure 4A:
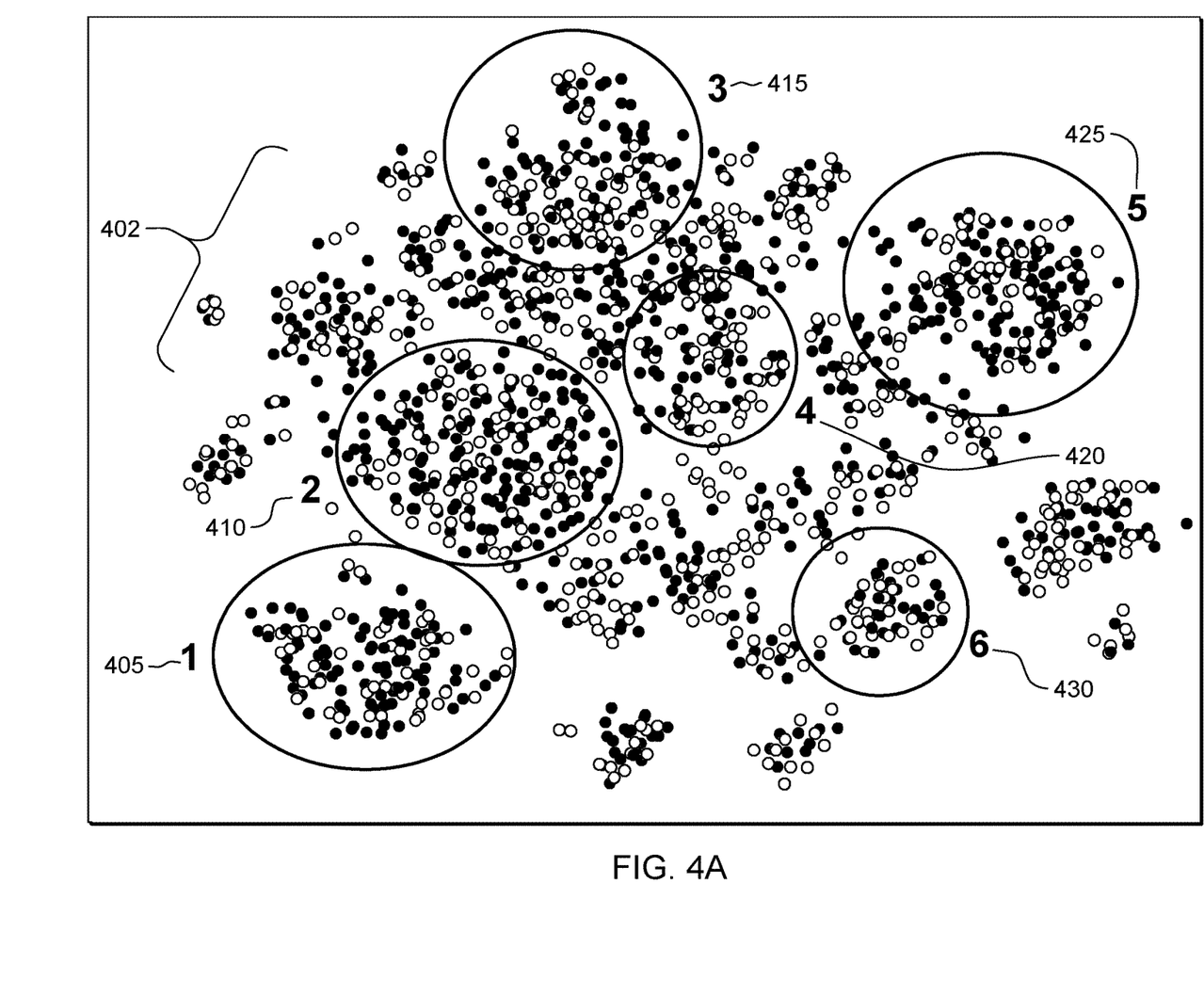
FIG. 4A is an exemplary depiction of data clustering, as performed by operations associated with program 300, in accordance with an embodiment of the present invention.

In step 320, program 300 clusters labeled and unlabeled data. In an embodiment, program 300 utilizes a K-means algorithm to cluster data 402, labeled and unlabeled data, into clusters 405, 410, 415, 420, 425, and 430 to determine data groups where a small amount of data is labeled. In an example, program 300 clusters data 402 consisting of unlabeled data from a textual source, such as an academic paper, and labeled data of the text in the academic paper, from computing device 110, using the K-means algorithm, to determine whether latent semantics exist in the data.

FIG. 4A illustrates an example of program 300 operating to cluster data, in accordance with an embodiment of the present invention. In this embodiment, program 300 operates on server 120 and is capable of clustering data already existing in neural network 102 or clustering data received from server 120 or computing device 110 through network 185. Data 402 is data containing both labeled and unlabeled instances in different gradients. Data 402 is organized into clusters 405, 410, 415, 420, 425, and 430. Each cluster contains both labeled and unlabeled instances.

In another embodiment, program 300 utilizes a mixture of Gaussians and Latent Dirichlet allocation (LDA) algorithms to cluster data 402. In an example, program 300 can classify the following set of sentences, 1. "I eat fish and vegetables," 2. "fish are pets," and 3. "my kitten eats fish." Program 300, utilizing the LDA algorithm, can classify the words "eat fish" and "vegetables" under topic F and label the group as "food." Program 300 would classify the words "fish," "pets," and "kitten" under a separate topic P and label the group as "pets." Program 300, through LDA, defines each topic as a group of words that permit program 300 to infer the content spread of each sentence by a word count. In this example, the first sentence is 100% Topic F, the second sentence is 100% topic P, and the third sentence is 33% topic P and 67% topic F. Program 300 determines the number of topics, assigns every word to a temporary topic, and checks and updates topic assignments to determine how prevalent a word is across topics and to determine how prevalent the topics are in the document. In this example, Gaussian algorithm, in combination with LDA algorithm, permits program 300 to assign a data point to more than one cluster to allow for greater flexibility than the rigidity of the topics utilized by LDA, to capture semantic relations, and to enlarge training data from a limited number of labeled instances.

In step 330, program 300 identifies coherent data clusters. In an embodiment, program 300 determines that cluster 405, 410, 415, 420, 425, and 430 generated in step 320 contain unlabeled and labeled data in the same cluster likely to belong to the same class. In an example, program 300 determines that a cluster is coherent if the majority of the labeled instances in the cluster belong to the same class. In an embodiment, program 300 can determine coherence of the cluster utilizing the algorithm $m\hat{\ }c = \arg\max \text{Count}(\hat{y}c[\text{class}=i])/\Sigma_{j}=1 \text{Count}(\hat{y}c[\text{class}=j])$, where n is the number of instances in cluster c and Count $(\hat{y}c[\text{label}=i)]$ represents the number of labeled instances belonging to class i in cluster c. m^c is the majority class of cluster c and l represents the total number of classes. In this example, program 300 generates clusters, from step 320, and determines the coherence of clusters 405, 410, 415, 420, 425, and 430 utilized by the previously mentioned algorithm. In this example, program 300 determines that cluster 405 corresponds to class one and has a 31% coherence value, cluster 410 corresponds to class two and has a 54% coherence value, cluster 415 corresponds to class three and has an 87% coherence value, cluster 420 corresponds to class four and has a 61% coherence value, and cluster 425 corresponds to class five and has a 97% coherence value.

In step 340, program 300 filters and assigns labels to the clusters. In an example, program 300 filters the clusters determined to be coherent in step 330 and labels the clusters that program 300 determined, from step 330, to 415 and 425 have a high proportion of a class as a function of the coherence rate equaling 87% and 97% respectively, based on a threshold function value of 0.8 indicating that other instances in the cluster belong to the same class. Hidden layer 206 is an example of a linear threshold function because hidden layer 206 makes decisions on the input it receives from input layer 204, or other hidden layers (not shown), by summing up or weighing all the different data input received from input layer 204.

Program 300 utilizes a stochastic gradient descent gradual optimization algorithm to separate the clustered data in multiple classes. The stochastic gradient computes the non-linear mapping between the data that program 300 clustered in step 320. In this example, program 300 assigns 425 as the majority class if the determined ratio of 425 is greater than an initial threshold. Program 300 assigns the majority class as the label of all unlabeled instances in 415 and 425. In this example, program 300 determines 410 at a coherence value of 54%, 405 at a coherence value of 31%, and 420 at a coherence value of 61% have many different instances in the cluster that belong to different classes. Program 300 does not assign a label to the unlabeled instances in the cluster and filters the unlabeled clusters out from the labeled clusters. In this example, 405, 410, and 420 are unlabeled and as a result are filtered out from the labeled instances of 415 and 425 as a function of the coherence values indicating a high proportion of the class belonging to the same class.

Figure 4B:
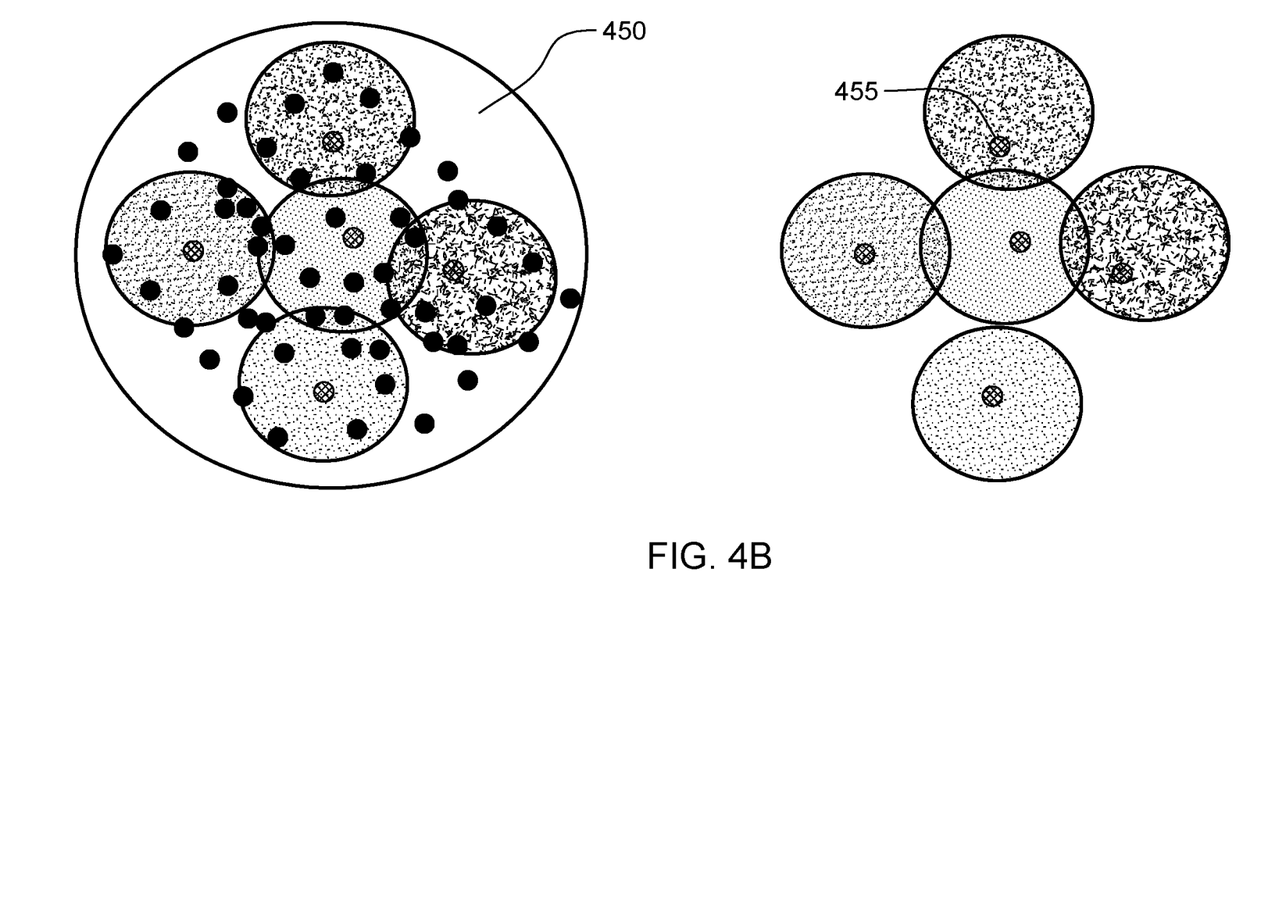
FIG. 4B is an exemplary depiction of data filtering, as performed by operations associated with program 300, in accordance with an embodiment of the present invention.

FIG. 4B illustrates an example of program 300 operating to filter data, in accordance with an embodiment of the present invention. In this embodiment, program 300 operates on server 120 and is capable of filtering clustered data already existing in neural network 102 or filtering clustered data received from server 120 or computing device 110 through network 185. Data cluster 450 is data containing a large amount of unlabeled data and a small amount of labeled data. Data cluster 455 is data containing a small amount of labeled data. In the depicted example of FIG. 4B, the dots filled in with cross-hatching represent labeled data, the completely filled-in dots represent unlabeled data, and the larger circles are representative of the bounds of a cluster. Data cluster 450 can be randomly weighted, and data cluster 455 is weighted with the results from the first pre-training step. In another example, data cluster 450 depicts program 300 filtering randomly clustered data composed of unlabeled and labeled data. In this example, data cluster 455 depicts program 300 having utilized only small amounts of labeled data after step 340.

In step 350, program 300 pre-trains the network using manually labeled data and automatically assigned data. In an embodiment, pre-training is a form of transfer learning. For example, neural network 102 is trained on dataset A, and neural network 102 contains dataset A. Neural network 102 is ready to receive dataset B from program 300 for neural network 102 to train on in addition to dataset A. Before 102 receives dataset B, the individual layers that make up neural network 102 are fine-tuned by training neural network on dataset B. In an example, program 300 pre-trains the network using both the manually labeled data, and the automatically labeled instances of data from step 340. In this example, program 300 trains a stack of auto encoders using both manually labeled data and the automatically labeled data from step 340. In this example, program 300 constructs, using data from storage 160 of weights from previously generated neural networks, a neural network with three hidden layers. The first, second, and third layer contain 4800, 256, and 128 neurons respectively. Program 300 constructs the neural networks to minimize training errors. Program 300 randomly initializes the initial weights in this step. In this example, program 300 applies a 50% drop out regularization to overcome over-fitting. Drop out prevents overfitting of hidden layers by randomly setting a certain percentage of hidden units to zero.

In step 360, program 300 fine tunes the weights. In an embodiment, program 300 fine tunes the labels assigned to the clusters in step 340 to reduce the training errors using only the labeled data. Fine tuning is the process by which the initial weights determined by neural network 102 during the initial phase of receiving data are altered to more accurately model the actual output data to the expected output data. In this process, program 300 can change the labels assigned to clusters 405, 410, 415, 420, 425, and 430 if neural network 102 is altered during the fine-tuning process. Program 300 can fine tune the weights of the clusters because clusters 405, 410, 415, 420, 425, and 430 may have been incorrectly trained due to errors in the clustering process in step 320. Program 300 fine tunes neural network 102 by optimizing the negative conditional log-likelihood of the target class of data received in step 210 as given by the soft-max output of 208. In an example, program 300 updates only the soft-max multilayer layer neural network layer of 206. In this example, the deep networks are already initialized with the weight parameters learned in the pre-training and only the final soft-max layers 208 get updated using the labeled data. In another example, program 300 updates configuration 200. In this example, program 300 retrains the entire neural network that includes input layer 204, hidden layer 206, and outer layer 208 using the manually labeled instances and deploys the retrained layers to neural network 102.

Figure 4C:
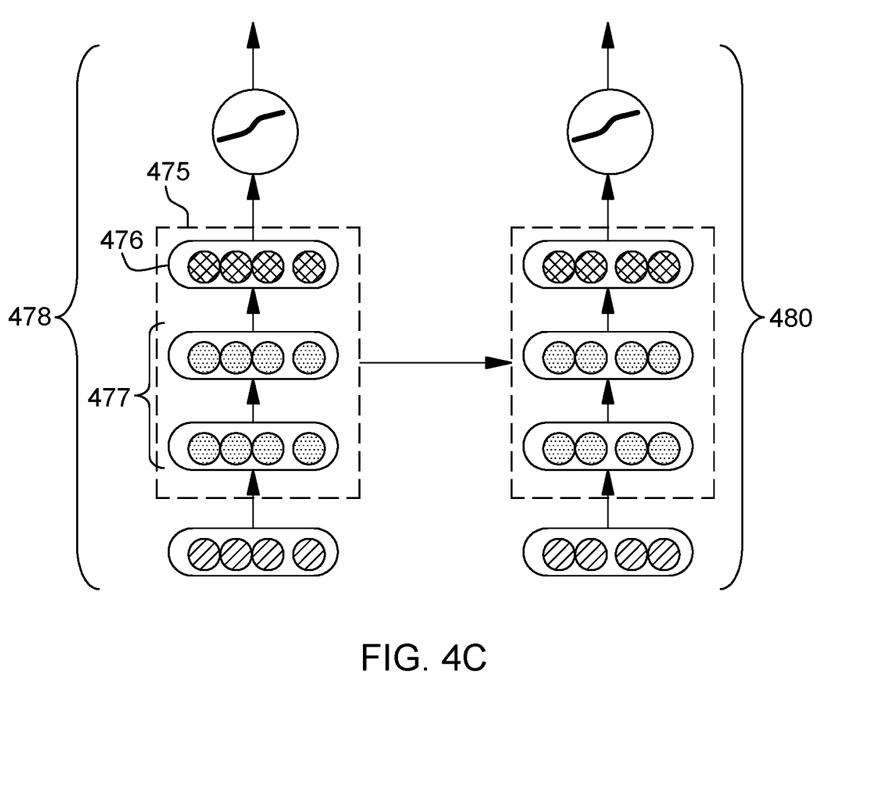
FIG. 4C is an exemplary depiction of pre-training networks using pre-trained weighted data, as performed by operations associated with program 300, in accordance with an embodiment of the present invention.

FIG. 4C illustrates an example of program 300 operating to pre-train networks using pre-trained weighted data, in accordance with an embodiment of the present invention. In this embodiment, program 300 operates on server 120 and is capable of filtering clustered data already existing in neural network 102, or filtering clustered data received from server 120 or computing device 110 through network 185. Neural network 475 is a semi-supervised pre-training neural network using clustered data. Neural network 480 is a supervised, fine-tuned neural network. Layer 476 is the output layer that produces embeddings of the data, layer 477 is the middle layer, and layer 478 is the input layer. Neural network 475 is pre-trained using labeled data and clustered data. Neural network 480 fine tunes the neural network using only the labeled data.

Figure 4D:
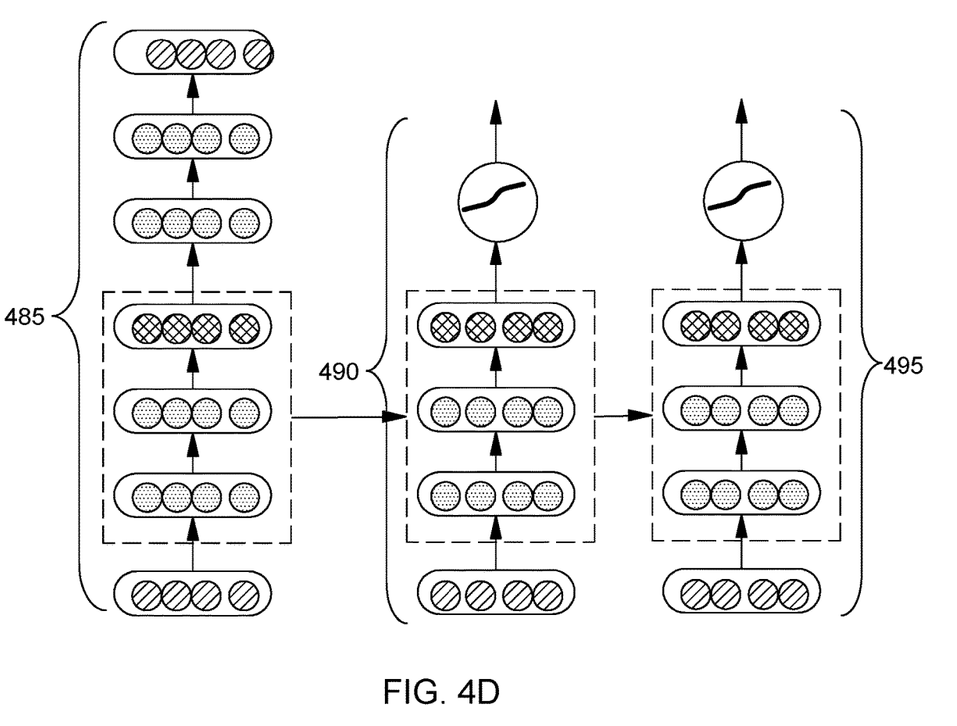
FIG. 4D is an exemplary depiction of pre-training networks using randomly weighted data, as performed by operations associated with program 300, in accordance with an embodiment of the present invention.

FIG. 4D illustrates an example of program 300 operating to pre-train networks using randomly weighted data, in accordance with an embodiment of the present invention. In this embodiment, program 300 operates on server 120 and is capable of filtering clustered data already existing in neural network 102, or filtering clustered data received from server 120 or computing device 110 through network 185. Auto-encoder 485 is an unsupervised deep auto-encoder. Neural network 490 is an initialized neural network with weights for the data obtained from auto-encoder 485. Neural network 495 is a neural network trained using labeled and clustered data. Auto-encoder 485 is trained using all input data, labeled and unlabeled that initializes the weights of a second set of auto-encoders. Neural network 490 is trained using the initialized weights in auto-encoder 485. Neural network 495 is trained using the initialized data of neural network 490.

Figure 5:
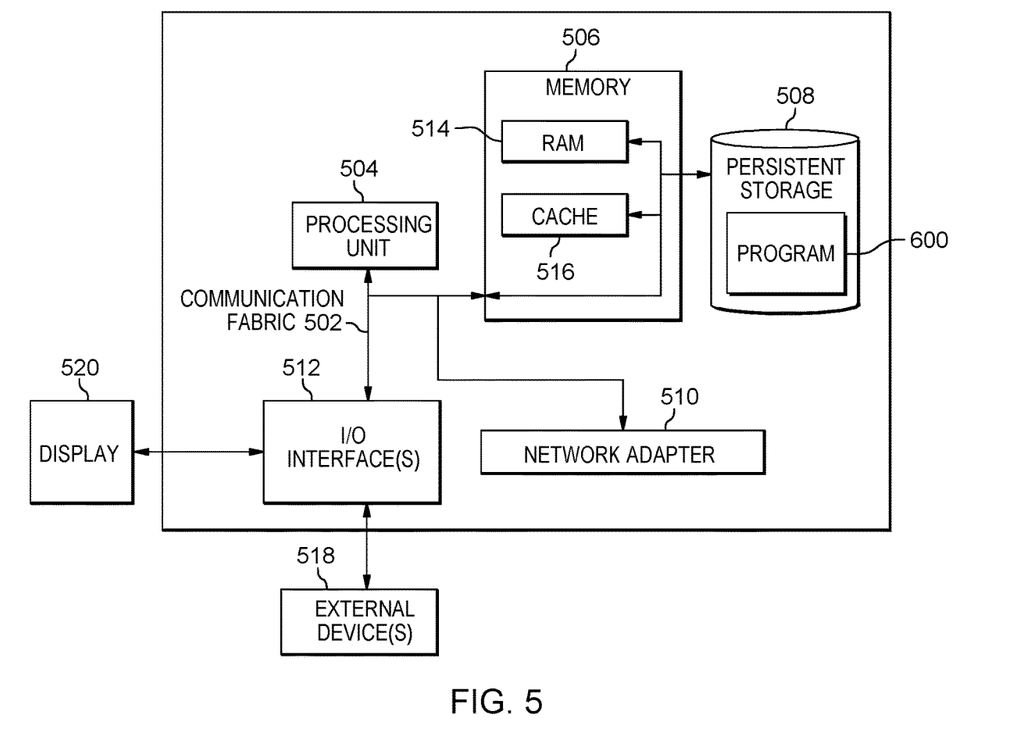
FIG. 5 is a block diagram of components of a computer system, such as the server computer of FIG. 1, in an embodiment in accordance with the present invention.

FIG. 5 depicts a block diagram of components of server 120, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Server 120 includes communications fabric 502, which provides communications between cache 516, memory 506, persistent storage 508, network adapter 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 504 by holding recently accessed data, and data near accessed data, from memory 506.

Program 300 may be stored in persistent storage 508 and in memory 506 for execution by one or more of the respective computer processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Network adapter 510, in these examples, provides for communications with other data processing systems or devices. In these examples, network adapter 510 includes one or more network interface cards. Network adapter 510 may provide communications through the use of either or both physical and wireless communications links. Program 300 may be downloaded to persistent storage 508 through network adapter 510.

I/O interface(s) 512 allows for input and output of data with other devices that may be connected to server computer 120. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., program 300, can be stored on such portable computer readable storage media and can be loaded onto persistent storage 508 via I/O interface(s) 312. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for pre-training a neural network, the method comprising:
   extracting, by one or more processors, features of a data set received from a source, wherein the data set includes labelled data and unlabeled data;
   generating, by one or more processors, a plurality of data clusters from instances of data in the data set, wherein the data clusters are weighted according to a respective number of similar instances of labeled data and unlabeled data within a respective data cluster;
   determining, by one or more processors, a coherence value for a selected data cluster based, at least in part, on a ratio of $\hat{m}c = \arg\max \text{Count}(\hat{y}c[\text{class}=i])$ to $\Sigma j=1$ Count $(\hat{y}c [\text{class}=j])$, wherein n is a number of instances in the selected cluster c, Count $(\hat{y}c[\text{label}=i])$ represents a number of labeled instances belonging to a selected class i in the selected cluster c, $\hat{m}c$ is a majority class of the selected cluster c, and 1 represents a total number of classes in the selected cluster;
   determining, by one or more processors, a data label indicating a data class that corresponds to labeled data within a data cluster of the generated plurality of data clusters;
   interacting, by one or more processors, with a graphical user interface (GUI) adapted and arranged to communicate information regarding the coherence value;
   applying, by one or more processors, the determined data label to unlabeled data within the data cluster of the generated plurality of data clusters; and
   in response to applying the determined data label to unlabeled data within the data cluster of the generated plurality of data clusters, deploying, by one or more processors, the data cluster to a neural network.

2. The method of claim 1, wherein deploying the data cluster to the neural network further comprises:
   training, by one or more processors, an auto-encoder utilizing the deployed data cluster.

3. The method of claim 1, wherein applying the determined data label to unlabeled data within the data cluster further comprises:
   determining, by one or more processors, that the neural network utilizes weighted data; and updating, by one or more processors, the data cluster with weighting parameters utilized by the neural network.

4. The method of claim 1, wherein deploying the data cluster to the neural network further comprises:
deploying, by one or more processors, the data cluster into an input layer in the neural network.

5. The method of claim 1, further comprising:
tuning, by one or more processors, a weight of the neural network, wherein the tuning utilizes a sample of labeled data; and
deploying, by one or more processors, the tuned weight into one or more layers of the neural network.

6. The method of claim 1, further comprising:
identifying, by one or more processors, a labelled data point in a first data cluster of the plurality of data clusters from instances of data in the data set;
identifying, by one or more processors, at least one additional data cluster that has a semantic relationship to a label of the labelled data point;
assigning, by one or more processors, the label of the labelled data point to the at least one additional data cluster; and
deploying, by one or more processors, the at least one additional data cluster to the neural network.

7. The method of claim 1, wherein the information regarding the coherence value includes at least one of a desired coherence value threshold and the determined coherence value.

8. A computer program product for pre-training a neural network, the computer program product comprising:
one or more computer readable tangible storage media and program instructions stored on at least one of the one or more computer readable storage media, the program instructions readable/executable by one or more computer processors and further comprising:
program instructions to extract features of a data set received from a source, wherein the data set includes labelled data and unlabeled data;
program instructions to generate a plurality of data clusters from instances of data in the data set, wherein the data clusters are weighted according to a respective number of similar instances of labeled data and unlabeled data within a respective data cluster;
program instructions to determine a coherence value for a selected data cluster based, at least in part, on a ratio of $\hat{m}c = \arg\max \text{Count}(\hat{y}c[\text{class}=i])$ to $\Sigma j=1 \text{Count}(\hat{y}c[\text{class}=j])$, wherein n is a number of instances in the selected cluster c, $\text{Count}(\hat{y}c[\text{label}=i])$ represents a number of labeled instances belonging to a selected class i in the selected cluster c, $\hat{m}c$ is a majority class of the selected cluster c, and l represents a total number of classes in the selected cluster;
program instructions to determine a data label indicating a data class that corresponds to labeled data within a data cluster of the generated plurality of data clusters;
program instructions to interact with a graphical user interface (GUI) adapted and arranged to communicate information regarding the coherence value;
program instructions to apply the determined data label to unlabeled data within the data cluster of the generated plurality of data clusters; and
program instructions to in response to applying the determined data label to unlabeled data within the data cluster of the generated plurality of data clusters, deploy the data cluster to a neural network.

9. The computer program of claim 8, wherein the program instructions to deploy the data cluster to the neural network further comprises program instructions, stored on the one or more computer readable storage media, which when executed by a processor, cause the processor to:
train an auto-encoder utilizing the deployed data cluster.

10. The computer program of claim 8, wherein the program instructions to apply the determined data label to unlabeled data within the data cluster further comprises program instructions, stored on the one or more computer readable storage media, which when executed by a processor, cause the processor to:
determine that the neural network utilizes weighted data; and
update the data cluster with weighting parameters utilized by the neural network.

11. The computer program of claim 8, wherein the program instructions to deploy the data cluster to the neural network further comprises program instructions, stored on the one or more computer readable storage media, which when executed by a processor, cause the processor to:
deploy the data cluster into an input layer in the neural network.

12. The computer program of claim 8, further comprising program instructions, stored on the one or more computer readable storage media, which when executed by a processor, cause the processor to:
tune a weight of the neural network, wherein the tuning utilizes a sample of labeled data; and
deploy the tuned weight into one or more layers of the neural network.

13. The computer program of claim 8, further comprising program instructions, stored on the one or more computer readable storage media, which when executed by a processor, cause the processor to:
identify a labelled data point in a first data cluster of the plurality of data clusters from instances of data in the data set;
identify at least one additional data cluster that has a semantic relationship to a label of the labelled data point;
assign the label of the labelled data point to the at least one additional data cluster; and
deploy the at least one additional data cluster to the neural network.

14. The computer program of claim 8, wherein the information regarding the coherence value includes at least one of a desired coherence value threshold and the determined coherence value.

15. A computer system for pre-training a neural network, the computer system comprising:
one or more computer processors;
one or more computer readable storage media; and
program instructions stored on the one or more computer readable storage media for execution by at least one of the one or more computer processors, the program instructions comprising:
program instructions to extract features of a data set received from a source, wherein the data set includes labelled data and unlabeled data;
program instructions to generate a plurality of data clusters from instances of data in the data set, wherein the data clusters are weighted according to a respective number of similar instances of labeled data and unlabeled data within a respective data cluster;
program instructions to determine a coherence value for a selected data cluster based, at least in part, on a ratio of $\hat{m}c = \arg\max \text{Count}(\hat{y}c[\text{class}=i])$ to $\Sigma j=1 \text{Count}(\hat{y}c[\text{class}=j])$, wherein n is a number of instances in the selected cluster c, Count ($\hat{y}c[\text{label}=i]$) represents a number of labeled instances belonging to a selected class i in the selected cluster c, $\hat{m}c$ is a majority class of the selected cluster c, and 1 represents a total number of classes in the selected cluster;

program instructions to determine a data label indicating a data class that corresponds to labeled data within a data cluster of the generated plurality of data clusters;

program instructions to interact with a graphical user interface (GUI) adapted and arranged to communicate information regarding the coherence value;

program instructions to apply the determined data label to unlabeled data within the data cluster of the generated plurality of data clusters; and program instructions to in response to applying the determined data label to unlabeled data within the data cluster of the generated plurality of data clusters, deploy the data cluster to a neural network.

16. The computer system of claim 15, wherein the program instructions to deploy the data cluster to the neural network further comprises program instructions, stored on the one or more computer readable storage media, which when executed by a processor, cause the processor to:

train an auto-encoder utilizing the deployed data cluster.

17. The computer system of claim 15, wherein the program instructions to apply the determined data label to unlabeled data within the data cluster further comprises program instructions, stored on the one or more computer readable storage media, which when executed by a processor, cause the processor to:

determine that the neural network utilizes weighted data; and update the data cluster with weighting parameters utilized by the neural network.

18. The computer system of claim 15, wherein the program instructions to deploy the data cluster to the neural network further comprises program instructions, stored on the one or more computer readable storage media, which when executed by a processor, cause the processor to:

deploy the data cluster into an input layer in the neural network.

19. The computer system of claim 15, further comprising program instructions, stored on the one or more computer readable storage media, which when executed by a processor, cause the processor to:

tune a weight of the neural network, wherein the tuning utilizes a sample of labeled data; and deploy the tuned weight into one or more layers of the neural network.

20. The computer system of claim 15, wherein the information regarding the coherence value includes at least one of a desired coherence value threshold and the determined coherence value.

* * * * *